United States Patent
Wood

(10) Patent No.: US 9,955,454 B2
(45) Date of Patent: Apr. 24, 2018

(54) DEVICE AND METHOD FOR AUTOMATIC NOTIFICATION CUSTOMIZATION

(71) Applicant: BLACKBERRY LIMITED, Waterloo (CA)

(72) Inventor: Christopher William Wood, Kanata (CA)

(73) Assignee: BLACKBERRY LIMITED, Waterloo (CA)

( * ) Notice: Subject to any disclaimer, the term of this patent is extended or adjusted under 35 U.S.C. 154(b) by 0 days.

(21) Appl. No.: 15/251,227

(22) Filed: Aug. 30, 2016

(65) Prior Publication Data

US 2018/0063812 A1    Mar. 1, 2018

(51) Int. Cl.
*H04M 3/00* (2006.01)
*H04W 68/02* (2009.01)
*H04W 8/18* (2009.01)
*H04M 19/04* (2006.01)

(52) U.S. Cl.
CPC ......... *H04W 68/02* (2013.01); *H04M 19/041* (2013.01); *H04W 8/18* (2013.01)

(58) Field of Classification Search
CPC ...... H04W 8/18; H04W 68/02; H04M 19/041
USPC ..................................... 455/418, 414.1, 415
See application file for complete search history.

(56) References Cited

U.S. PATENT DOCUMENTS

| | | | |
|---|---|---|---|
| 7,248,900 B2 * | 7/2007 | Deeds ................ | H04M 19/041 379/142.01 |
| 2006/0121949 A1 | 6/2006 | Awada et al. | |
| 2013/0303132 A1 | 11/2013 | Kwong | |
| 2014/0136629 A1 | 5/2014 | Nguyen | |
| 2014/0365569 A1 | 12/2014 | Vyrros et al. | |
| 2015/0079949 A1 * | 3/2015 | Vishwanath ............ | H04M 3/02 455/414.1 |
| 2015/0095437 A1 | 4/2015 | Park et al. | |

FOREIGN PATENT DOCUMENTS

EP    2226992 A1    9/2010
EP    2950182 A1    12/2015

OTHER PUBLICATIONS

Extended European Search Report, dated Jan. 26, 2018, by EPO, re European Patent Application No. 17188575.9.

* cited by examiner

*Primary Examiner* — Chuck Huynh
(74) *Attorney, Agent, or Firm* — Perry + Currier Inc.

(57) ABSTRACT

A device and method for automatic notification customization is provided. The device includes: a controller; a notification device; and a memory storing: notification data; and identification data, the identification data comprising one or more of: an identifier of the device; and an account identifier identifying an account associated with the device. The controller: alters the notification data using the identification data to generate altered notification data; determines that a notification of an event is to occur at the device; and controls the notification device to provide the altered notification.

18 Claims, 11 Drawing Sheets

DEVICE AND METHOD FOR AUTOMATIC NOTIFICATION CUSTOMIZATION

FIELD

The specification relates generally to mobile devices, and specifically to a device and method for automatic notification customization.

BACKGROUND

When a group of individuals each have the same (or similar) device, each device often has the same ringtones and notification sounds (either by default or by chance). Hence, when an event occurs at one of the devices, such as receipt of call, and a notification of the event is provided, such as a ringtone, the notification is often identical to notifications provided at the other devices. This leads to confusion and a waste of resources at each of the other devices phones as they are checked.

Similarly, when multiple accounts are associated with a device, a notification of an event can be the same for each account (either by default or by chance). Hence, when an event occurs at the device associated one of the accounts, whether active or inactive, confusion can again occur.

While in each of these instances notifications can be manually customized, it can still be difficult to ensure that a notification is different from notifications provided by proximal devices.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
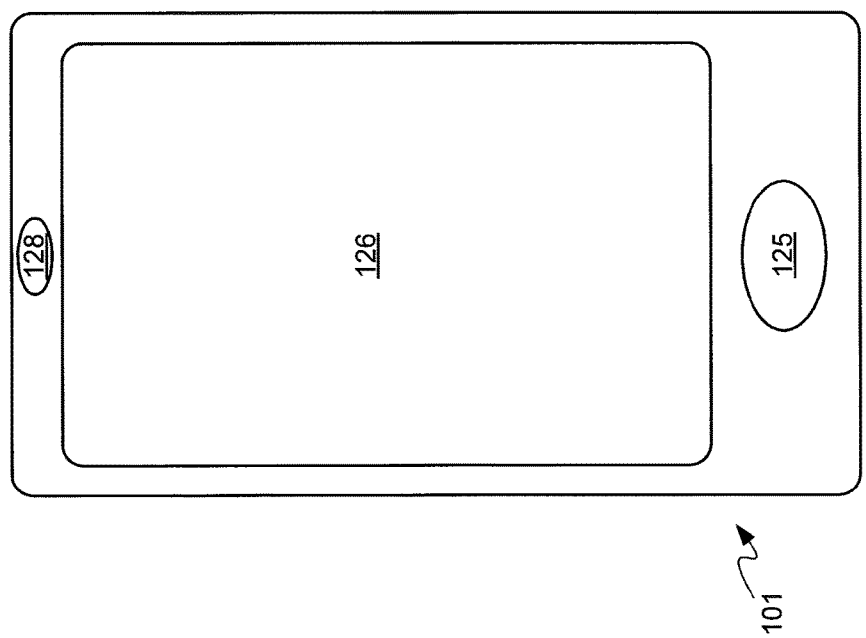
FIG. 1 depicts a front perspective view of a device for automatic notification customization, according to non-limiting implementations.

The present disclosure describes examples of a device that is configured to automatically generate customized notifications based on identification data stored at the device, which can include a device identifier (such as a MAC (media access control) address, and the like), an account identifier, and the like. Notification data is automatically altered using the identification data such that the altered notification data is customized for the device and/or the account. When a notification of an event is to occur at the device, the altered notification data is provided at a notification device. For example, the notification data can comprise a default ringtone which has been provisioned at the device and, altering the default ringtone can comprise adding sound, subtracting sound, and/or altering tone, pitch and/or duration of at least a portion of the default ringtone using the identification data such that the altered default ringtone, when provided at a speaker of the device, sounds different from the same default ringtone at another device. Alternatively, the device can be associated with a plurality of accounts, as identified by a plurality of account identifiers. The notification data is altered using each of the plurality of account identifiers to produce a plurality of altered notification data. When an event occurs associated with one of the accounts, whether active or inactive, the altered notification data associated with the account is used to provide a notification. For example, when a message is received for an inactive account (e.g. an account which is not currently logged into), an altered default message notification sound (generated from a default message notification sound altered using the account identifier of the inactive account) is used for a notification of the message. Such an altered default message notification sound is automatically customized to distinguish it from notifications of message of other accounts at the device. Furthermore, automatically customized notifications can be audible notifications, visual notifications (using a display, lights, light emitting diodes, etc.), and/or haptic notifications.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

Furthermore, as will become apparent, in this specification certain elements may be described as connected physically, electronically, or any combination thereof, according to context. In general, components that are electrically connected are configured to communicate (that is, they are capable of communicating) by way of electric signals. According to context, two components that are physically coupled and/or physically connected may behave as a single element. In some cases, physically connected elements may be integrally formed, e.g., part of a single-piece article that may share structures and materials. In other cases, physically connected elements may comprise discrete components that may be fastened together in any fashion. Physical connections may also include a combination of discrete components fastened together, and components fashioned as a single piece.

An aspect of the specification provides a device comprising: a controller; a notification device; and a memory storing: notification data; and identification data, the identification data comprising one or more of: an identifier of the device; and an account identifier identifying an account associated with the device, the controller configured to: alter the notification data using the identification data to generate altered notification data; determine that a notification of an event is to occur at the device; and control the notification device to provide the altered notification.

The identification data can further comprise a plurality of account identifiers, including the account identifier, each of the plurality of account identifiers identifying a corresponding account, of a plurality of accounts associated with the device, in a one-to-one relationship, the controller further configured to: alter the notification data using a given account identifier, of the plurality of account identifiers, to generate the altered notification data; determine that the notification of the event is to occur at the device for a given account identified by the given account identifier; and control the notification device to provide the altered notification data. The controller is further configured to: activate one account, of the plurality of accounts, at a time; and, control the notification device to provide the altered notification data when the given account is active or inactive.

The controller can be further configured to: generate a plurality of altered notification data sets, including the altered notification data, by altering the notification data using each of the plurality of account identifiers; and, determine which of the plurality of accounts is associated with a current event occurring at the device; and control the notification device to provide a given one of the plurality of altered notification data sets associated with an account associated with the current event.

The notification device can comprise a speaker, the notification data can comprise speaker notification data, and the controller can be further configured to alter the notification data by one or more of: adding to the to the speaker notification data, subtracting from the speaker notification data, and altering one or more of tone, pitch, and duration of sounds of the speaker notification data.

The controller can be further configured to alter the notification data using the identification data by producing a hash of at least a portion of the identification data and using the hash as input to an application for altering the notification data.

The identification data is static, and is stored at other devices associated with the account.

The event can comprise receiving a call at the device, and the notification data can comprise a ringtone.

The event can comprise receiving a message at the device, and the notification data can comprise message notification data.

The notification device can comprise a visual notification device, and the notification data can comprise visual notification data.

Another aspect of the specification provides a method comprising: at a device including: a controller; a notification device; and a memory storing: notification data; and identification data, the identification data comprising one or more of: an identifier of the device; and an account identifier identifying an account associated with the device, altering, at the controller, the notification data using the identification data to generate altered notification data; determining, at the controller, that a notification of an event is to occur at the device; and, controlling, at the controller, the notification device to provide the altered notification.

The identification data can further comprise a plurality of account identifiers, including the account identifier, each of the plurality of account identifiers identifying a corresponding account, of a plurality of accounts associated with the device, in a one-to-one relationship, and the method can further comprise: altering, at the controller, the notification data using a given account identifier, of the plurality of account identifiers, to generate the altered notification data; determining, at the controller, that the notification of the event is to occur at the device for a given account identified by the given account identifier; and determining, at the controller, the notification device to provide the altered notification data. The method can further comprise: activating, at the controller, one account, of the plurality of accounts, at a time; and, controlling, at the controller, the notification device to provide the altered notification data when the given account is active or inactive. The method can further comprise: generating, at the controller, a plurality of altered notification data sets, including the altered notification data, by altering the notification data using each of the plurality of account identifiers; and, determining, at the controller, which of the plurality of accounts is associated with a current event occurring at the device; and controlling, at the controller, the notification device to provide a given one of the plurality of altered notification data sets associated with an account associated with the current event.

The notification device can comprise a speaker, the notification data can comprise speaker notification data, and the method can further comprise altering, at the controller, the notification data by one or more of: adding to the to the speaker notification data, subtracting from the speaker notification data, and altering one or more of tone, pitch, and duration of sounds of the speaker notification data.

The method can further comprise altering, at the controller, the notification data using the identification data by producing a hash of at least a portion of the identification data and using the hash as input to an application for altering the notification data.

The identification data is static, and is stored at other devices associated with the account.

The event can comprise receiving a call at the device, and the notification data can comprise a ringtone.

The event can comprise receiving a message at the device, and the notification data can comprise message notification data.

The notification device can comprise a visual notification device, and the notification data can comprise visual notification data.

Yet a further aspect of the specification provides a computer-readable medium storing a computer program, wherein execution of the computer program is for: at a device including: a controller; a notification device; and a memory storing: notification data; and identification data, the identification data comprising one or more of: an identifier of the device; and an account identifier identifying an account associated with the device, altering, at the controller, the notification data using the identification data to generate altered notification data; determining, at the controller, that a notification of an event is to occur at the device; and, controlling, at the controller, the notification device to provide the altered notification. The computer-readable medium can comprise a non-transitory computer-readable medium.

Figure 2:
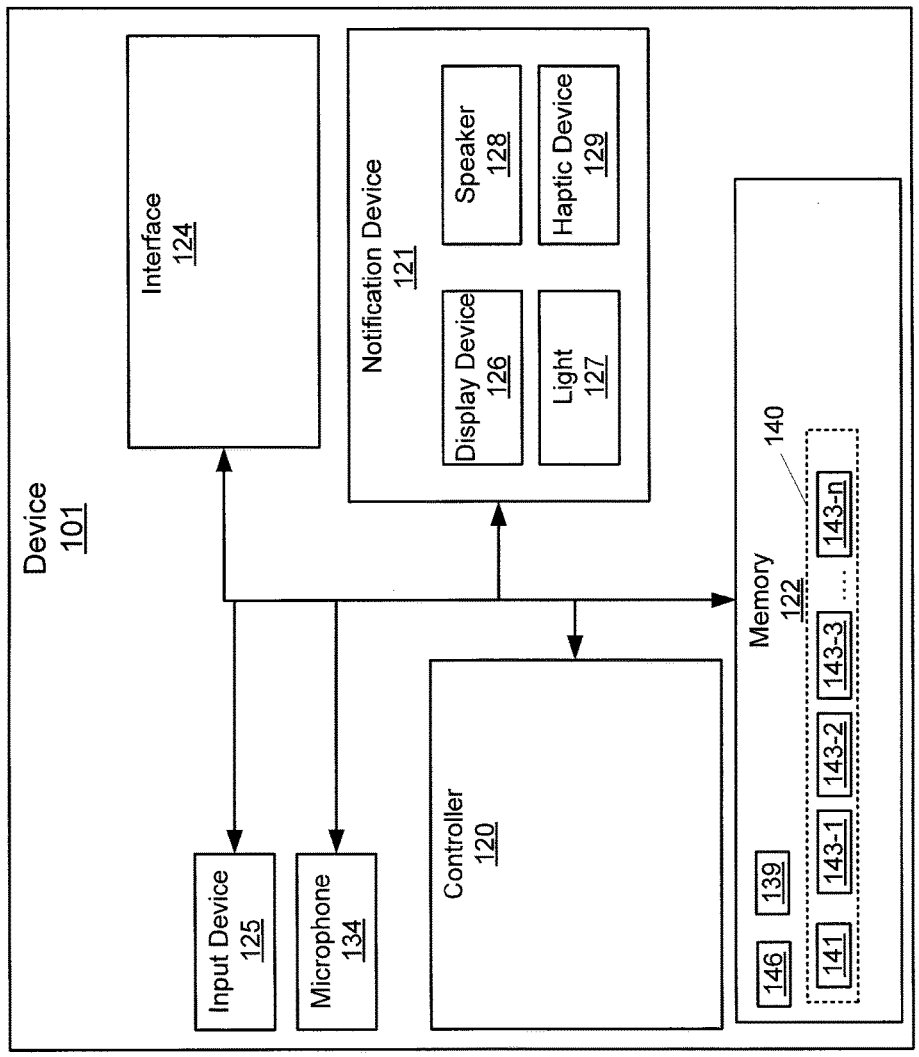
FIG. 2 depicts a schematic diagram of the device of FIG. 1, according to non-limiting implementations.

FIGS. 1 and 2 respectively depict a front perspective view and a schematic diagram of a mobile electronic device 101, referred to interchangeably hereafter as device 101. Device 101 comprises a controller 120; a notification device 121; a memory 122, a communication interface 124, and an input device 125. The notification device 121 can include one or more of a display device 126, a light 127, a speaker 128 and a haptic device 129. As depicted, device 101 further comprises a microphone 134. Memory 122 stores notification data 139 configured to be provided by notification device 121. Memory 122 further stores identification data 140 comprising one or more of: an identifier 141 of device 101; and one or more account identifiers 143-1, 143-2, 143-3 . . . 143-n identifying corresponding accounts associated with device 101.

One or more account identifiers 143-1, 143-2, 143-3 . . . 143-n will be interchangeably referred to hereafter, collectively, as account identifiers 143 and, generically, as an account identifier 143. Furthermore, while a number "n" account identifiers 143 are depicted, in some implementations, no account identifiers are stored at memory 122; indeed, a number of account identifiers 143 stored at memory 122 can correspond to a number of accounts associated with device 101. In some implementations where more than one account is associated with device 101, only one account can be active at a time; in other implementations where more than one account is associated with device 101, two or more accounts can be active at a time. A number of active accounts can depend on general functionality of device 101 and/or restrictions placed on device 101 by an associated operator and/or service provider. Either way, accounts associated with device 101 are identified by account identifiers 143. Such account identifiers 143 can include, but are not limited to, email addresses, network addresses, telephone numbers, cellular telephone numbers and the like.

Identifier 141 can comprise an identifier of device 101 which can include, but is not limited to, a MAC (media access control) address, a personal identification number (PIN) and the like.

Controller 120 is generally configured to: alter notification data 139 using the identification data 140 to generate altered notification data; determine that a notification of an event is to occur at device 101; and control notification device 121 to provide the altered notification. Alternatively, controller 120 can be generally configured to: alter notification data 139 using a given account identifier 143, of plurality of account identifiers 143, to generate altered notification data; determine that a notification of an event is to occur at device 101 for a given account identified by given account identifier 143; and control notification device 121 to provide the altered notification data.

Device 101 can be any type of electronic device that can be used in a self-contained manner to communicate with one or more communication networks. Device 101 can include, but is not limited to, any suitable combination of electronic devices, communications devices, computing devices, laptop computers, portable electronic devices, mobile computing devices, portable computing devices, tablet computing devices, laptop computing devices, desktop phones, telephones, PDAs (personal digital assistants), cellphones, smartphones, e-readers, internet-enabled appliances and the like. Other suitable devices are within the scope of present implementations.

Hence, it should be emphasized that the shape and structure of device 101 in FIGS. 1 and 2 are purely examples, and contemplate a device that can be used for both wireless voice (e.g. telephony) and wireless data communications (e.g. email, web browsing, text, and the like). However, implementations herein contemplate a device that can be used for any suitable specialized functions, including, but not limited to, one or more of, telephony, computing, appliance, and/or entertainment related functions.

Controller 120 can comprise a processor and/or a plurality of processors, including but not limited to one or more central processors (CPUs) and/or one or more processing units; either way, controller 120 comprises a hardware element and/or a hardware processor. Indeed, in some implementations, controller 120 can comprise an ASIC (application-specific integrated circuit) and/or an FPGA (field-programmable gate array) specifically configured to implement the functionality of controller 120.

In other words, controller 120 can be specifically adapted for antenna alignment using vibrational positioning. Hence, controller 120 is preferably not a generic computing device, but a device specifically configured to implement automatic notification customization functionality. For example, controller 120 can specifically comprise a computer executable engine configured to implement automatic notification customization functionality, as described below.

Memory 122 can comprise a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of controller 120 as described herein are typically maintained, persistently, in memory 122 and used by controller 120 which makes appropriate utilization of volatile storage during the execution of such programming instructions. Those skilled in the art recognize that memory 122 is an example of computer readable media that can store programming instructions executable by controller 120. Furthermore, memory 122 is also an example of a memory unit and/or memory module and/or a non-volatile memory.

In some implementations, memory 122 can include one or more SIM (Subscriber Identify Module) cards and one or more of account identifiers 143 can be stored on the one or more SIM cards.

Memory 122 generally stores an application 146 which, when processed by controller 120, enables controller 120 to: alter notification data 139 using the identification data 140 to generate altered notification data; determine that a notification of an event is to occur at device 101; and control notification device 121 to provide the altered notification. Alternatively, application 146, when processed by controller 120, enables controller 120 to: alter notification data 139 using a given account identifier 143, of plurality of account identifiers 143, to generate altered notification data; determine that a notification of an event is to occur at device 101 for a given account identified by given account identifier 143; and control notification device 121 to provide the altered notification data.

As described above, notification device 121 can comprise one or more of display device 126, light 127, speaker 128 and haptic device 129. Display device 126 can comprise one or more of flat panel displays (e.g. LCD (liquid crystal display), plasma displays, OLED (organic light emitting diode) displays, capacitive or resistive touchscreens), CRTs (cathode ray tubes) and the like. Light 127 comprises one or more of an indicator light, a light emitting diode (LED) and the like. Speaker 128 can comprise one or more speakers suitable for use with device 101 which can be used for notifications and/or in telephony applications. Haptic device 129 can comprise a vibrational motor configured to cause device 101 to vibrate to provide haptic feedback.

Either way, notification data 139 comprises data that can be used to control notification device 121 to provide a notification of an event occurring at device 101. Furthermore, notification data 139 is generally compatible with the notification device that is to be controlled to provide notifications. For example, notification data 139 can comprise data used to control display device 126 to provide graphical notifications including, but not limited to icons, animations and the like; and/or notification data 139 can comprise data used to control light 127 to provide visual notifications including, but not limited to, blinking light patterns, light colors and the like; and/or notification data 139 can comprise sound data used to control speaker 128 to provide audio notifications including, but not limited to, ringtones, notification sounds, message notification sounds and the like; and/or notification data 139 can comprise data used to control haptic device 129 to provide haptic notifications including, but not limited to, vibration patterns and the like. Indeed, notification data 139 can comprise any suitable combination of data for controlling different types of notification devices.

At least one input device 125 is generally configured to receive input data, and can comprise any suitable combination of input devices, including but not limited to a keyboard, a keypad, a pointing device (as depicted in FIG. 1), a mouse, a track wheel, a trackball, a touchpad, a touch screen and the like. Other suitable input devices are within the scope of present implementations.

Microphone 134 comprises any suitable microphone for receiving sound and converting to audio data.

Controller 120 also connects to communication interface 124 (interchangeably referred to as interface 124), which can be implemented as one or more radios and/or connectors and/or network adaptors, and/or configured to wirelessly communicate with one or more communication networks (not depicted). It will be appreciated that interface 124 can be configured to correspond with network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+ such as UMTS (Universal Mobile Telecommunications System), GSM (Global System for Mobile Communications), CDMA (Code division multiple access), FDD (frequency division duplexing), LTE (Long Term Evolution), TDD (time division duplexing), TDD-LTE (TDD-Long Term Evolution), TD-SCDMA (Time Division Synchronous Code Division Multiple Access) and the like, wireless data, Bluetooth links, NFC (near field communication) links, WLAN (wireless local area network) links, WiFi links, WiMax links, packet based links, the Internet, analog networks, the PSTN (public switched telephone network), access points, and the like, and/or a combination.

While not depicted, device 101 further comprises a power source, for example a battery, a power pack, and the like. In some implementations the power source can comprise a connection to a mains power supply and a power adaptor (e.g. and AC-to-DC (alternating current to direct current) adaptor).

Furthermore, while all components of device 101 are depicted as being part of an integrated handheld device, in other implementations one or more components can be external to a chassis of device 101 and in communication with controller 120 using interface 124; for example, one or more of input device 125, display device 126, speaker 128, etc. can be external to a chassis of device 101 and in communication with controller 120 using interface 124.

In any event, it should be understood that a wide variety of configurations for device 101 are contemplated.

Figure 3:
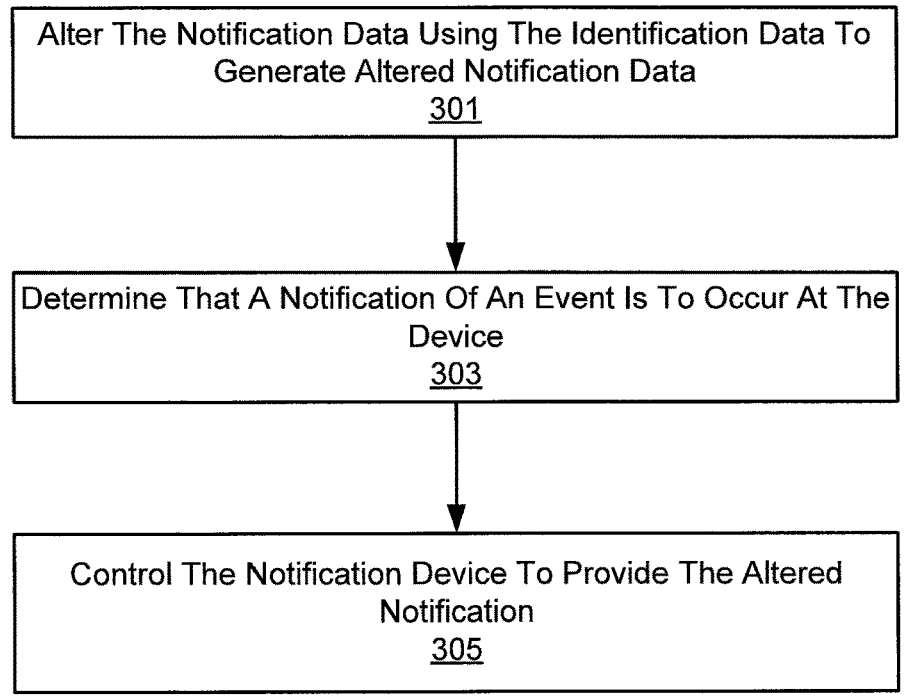
FIG. 3 depicts a block diagram of a flowchart of a method for automatic notification customization, according to non-limiting implementations.

Attention is now directed to FIG. 3 which depicts a flowchart of a method 300 for automatic notification customization, according to non-limiting implementations. In order to assist in the explanation of method 300, it will be assumed that method 300 is performed using device 101, and specifically by controller 120, for example when controller 120 processes application 146. Indeed, method 300 is one way in which device 101 and/or controller 120 can be configured. Furthermore, the following discussion of method 300 will lead to a further understanding of controller 120, and device 101 and its various components. However, it is to be understood that device 101 and/or controller 120 and/or method 300 can be varied, and need not work exactly as discussed herein in conjunction with each other, and that such variations are within the scope of present implementations.

Regardless, it is to be emphasized, that method 300 need not be performed in the exact sequence as shown, unless otherwise indicated; and likewise various blocks may be performed in parallel rather than in sequence; hence the elements of method 300 are referred to herein as "blocks" rather than "steps". It is also to be understood, however, that method 300 can be implemented on variations of device 101 as well. Furthermore, while controller 120 is described as implementing and/or performing each block of method 300, it is appreciated that each block of method 300 occurs using controller 120 processing application 146.

At block 301, controller 120 alters notification data 139 using the identification data 140 to generate altered notification data.

At block 303, controller 120 determines that a notification of an event is to occur at device 101.

At block 305, controller 120 controls notification device 121 to provide the altered notification data.

Figure 4:
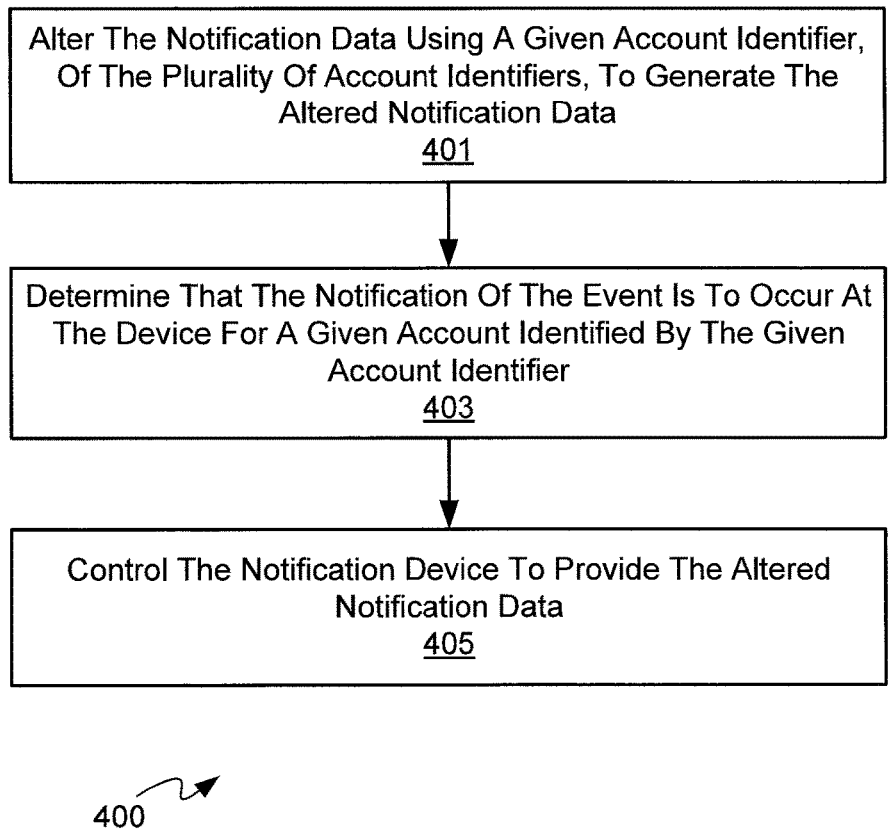
FIG. 4 depicts a block diagram of a flowchart of a method for automatic notification customization, according to alternative non-limiting implementations.

Attention is now directed to FIG. 4 which depicts a flowchart of a method 400 for automatic notification customization, according to non-limiting implementations. In order to assist in the explanation of method 400, it will be assumed that method 400 is performed using device 101, and specifically by controller 120, for example when controller 120 processes application 146. Indeed, method 400 is one way in which device 101 and/or controller 120 can be configured. Furthermore, the following discussion of method 400 will lead to a further understanding of controller 120, and device 101 and its various components. However, it is to be understood that device 101 and/or controller 120 and/or method 400 can be varied, and need not work exactly as discussed herein in conjunction with each other, and that such variations are within the scope of present implementations.

Regardless, it is to be emphasized, that method 400 need not be performed in the exact sequence as shown, unless otherwise indicated; and likewise various blocks may be performed in parallel rather than in sequence; hence the elements of method 400 are referred to herein as "blocks" rather than "steps". It is also to be understood, however, that method 400 can be implemented on variations of device 101 as well. Furthermore, while controller 120 is described as implementing and/or performing each block of method 400, it is appreciated that each block of method 400 occurs using controller 120 processing application 146.

At block 401, controller 120 alters notification data 139 using a given account identifier 143, of plurality of account identifiers 143, to generate altered notification data.

At block 403, controller 120 determines that a notification of an event is to occur at device 101 for a given account identified by given account identifier 143 (e.g. the same given account identifier 143 used to generate the altered notification data at block 401).

At block 405, controller 120 controls notification device 121 to provide the altered notification data.

In particular, it is appreciated that method 400 comprises a special instance of method 300, as well be described below.

Indeed, aspects of method 300 and method 400 will now be described with respect to FIG. 5 to FIG. 11. In particular each of FIGS. 5, 6, 7, 9, 10 and 11 are substantially similar to FIG. 2, with like elements having like numbers. Furthermore, present implementations will be described with respect to notification data 139 comprising speaker notification data, such as a ringtone and the like. Indeed, in such implementations, notification data 139 can comprise a default ringtone provisioned at device 101 at a factory, and the like, with a setting at device 101 indicating that the default ringtone is to be provided and/or played and/or rendered at speaker 128 when a call is received at device 101.

Figure 5:
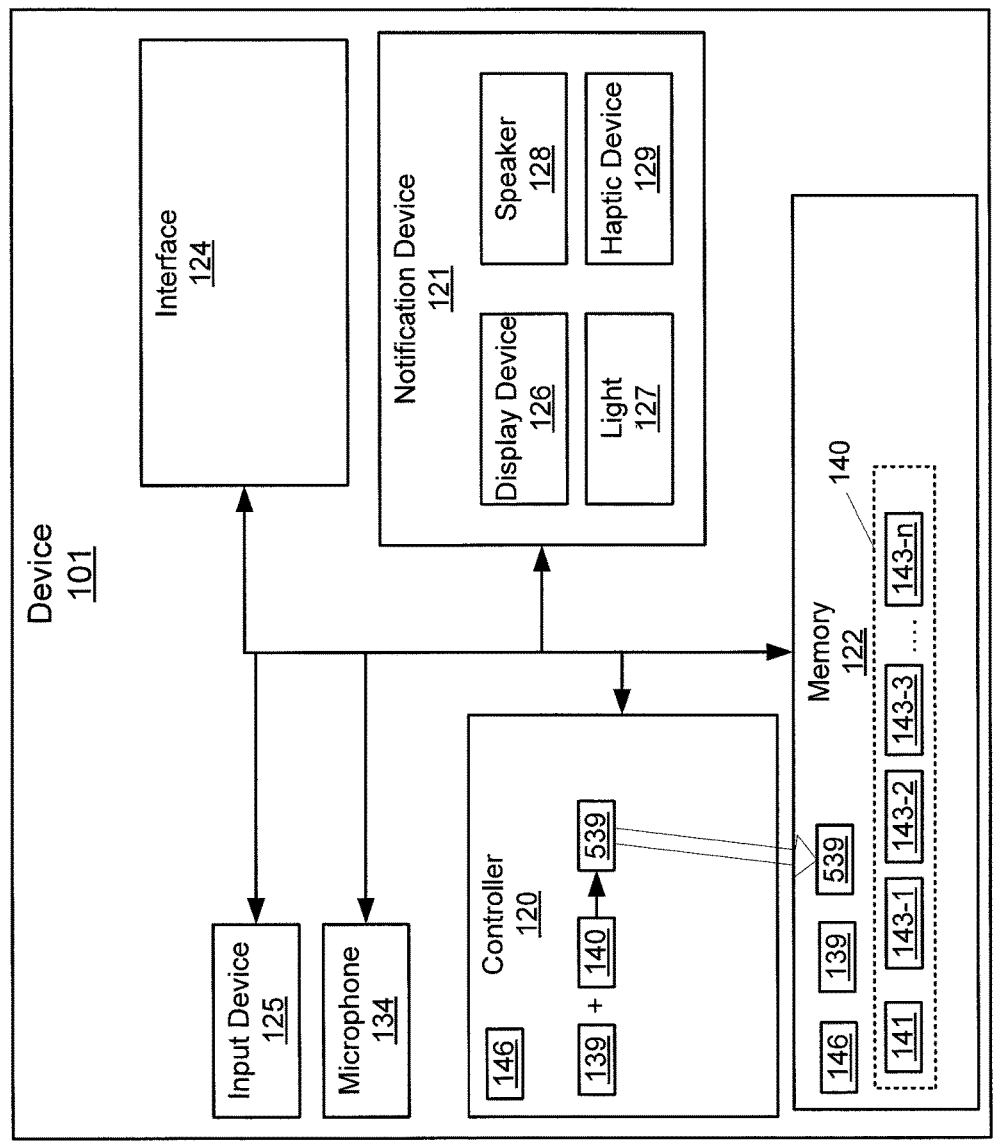
FIG. 5 depicts the device of FIG. 2 generating altered notification data, according to non-limiting implementations.

Attention is next directed to FIG. 5 which depicts an implementation of block 301 of method 300. In particular, in FIG. 5, controller 120 alters notification data 139 using identification data 140 to generate altered notification data 539. For example, when notification data 139 comprises speaker notification data, and the like, controller 120 can alter notification data 139 by one or more of adding to the to the speaker notification data, subtracting from the speaker notification data, and altering one or more of tone, pitch, and duration of sounds of the speaker notification data. Such altering can occur according to an algorithm of application 146 (e.g. application 146 comprises an application for altering notification data 139). For example, in some implementations, controller 120 can be configured to produce a hash of at least a portion of identification data 140 and use the hash as input to the application for altering notification data 139. Hence, as a given hash function can produce an alphanumeric sequence of a same given length, regardless of a length of the input, use of such a hash can simplify the application for altering notification data 139 as the input will be of a same given length regardless of the length and/or type of identification data 140.

Furthermore, any suitable scheme for altering notification data 139, and specifically speaker notification data, is within the scope of present implementations. For example, identification data 140 and/or a hash thereof, can be used as an input to add one or more sounds to the speaker notification data and/or to remove one or more sounds from the speaker notification data. When adding sound, the hash of the identification data can be used in a scheme for generating a sound to be added; for example, the alphanumeric characters of the hash can be converted to a tone sequence with letters and numbers corresponding to tones on a scale. However, the alphanumeric characters can also be converted to sounds using a text-to-speech algorithm and/or converted to sounds in any other suitable manner Such sounds can be added at the beginning of the speaker notification data, at the end of the speaker notification data, and/or in the speaker notification data according to any scheme. Indeed, a placement of the sounds in the speaker notification data can also occur according to the alphanumeric characters of the hash; for example, a given one of the hash can be used as an indicator as to where to place the resulting sounds in the speaker notification data.

Furthermore, the resulting sounds can be combined with the speaker notification data, for example added overtop existing sounds in the speaker notification data and/or combined using frequency mixing, and the like.

Similarly, the hash can be used to remove and/or subtract sounds; for example, the alphanumeric characters of the hash can be used to indicate positions in the speaker notification data from which sounds are to be removed, as well as a length of the sounds that are to be removed.

Similarly, sounds of in the speaker notification data can be altered by altering one or more of tone, pitch, and duration of sounds of the speaker notification data, again using the alphanumeric characters of the hash as input and/or as indicators of positions of sounds in the speaker notification data that are to be altered, as well as indicators of types of alterations that are to occur.

Indeed, any scheme can be used to alter the speaker notification data.

Furthermore, while alteration of the speaker notification data, alterations can occur to display notification data, light notification data and haptic notification data.

In any event, once altered notification data 539 is generated, altered notification data 539 can be stored at memory 122, as also depicted in FIG. 5.

In particular altered notification data 539 is generated using data already stored at device 101 and not data received in an event for which a notification is to be provided. For example, as will be described hereafter, an event can occur at device 101 during which data is received; however altered notification data 539 is not generated using such received data, but rather using data and/or static data already stored at device 101.

Figure 6:
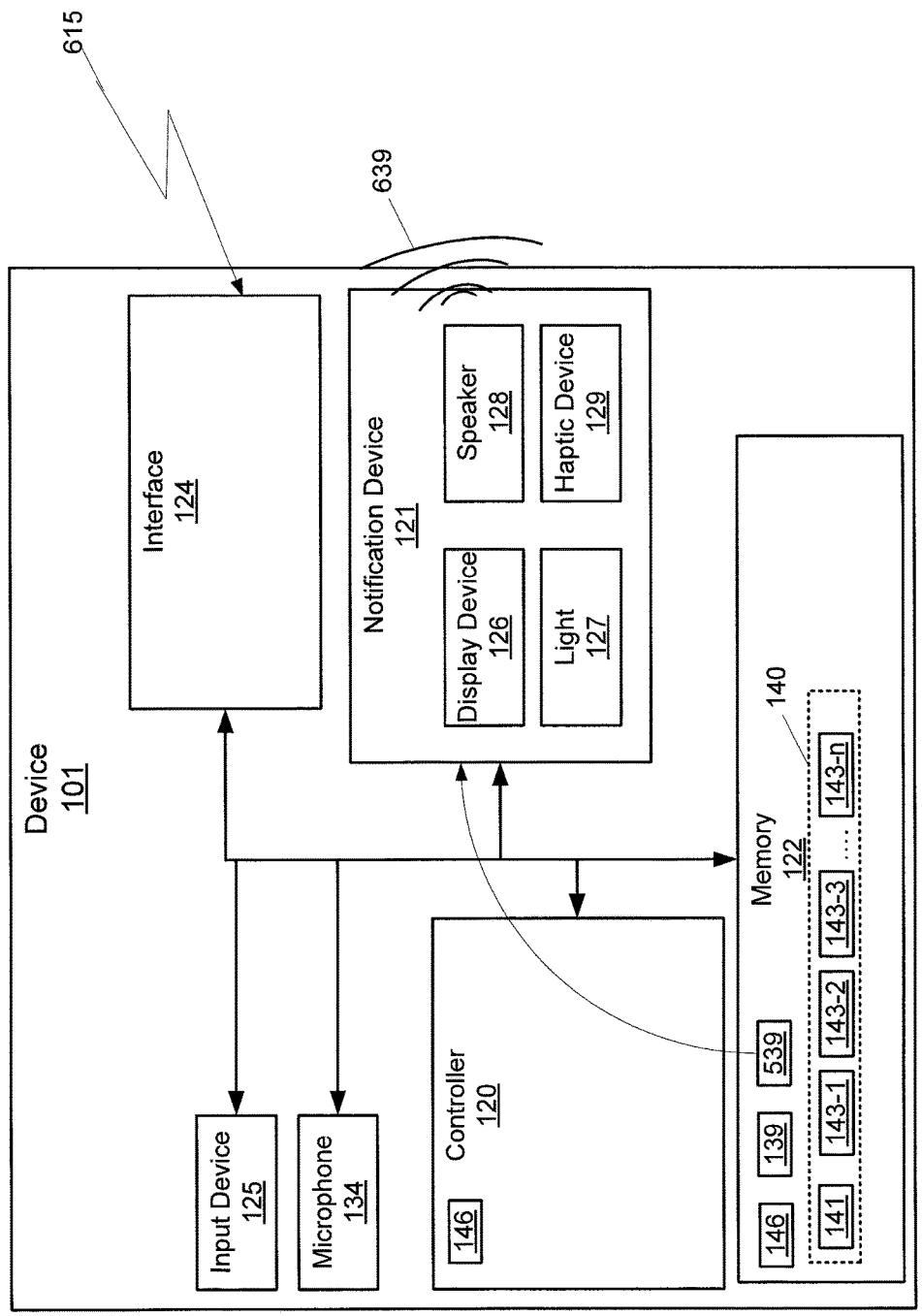
FIG. 6 depicts the device of FIG. 2 providing a customized notification using altered notification data, the altered notification data generated prior to an event occurring, according to non-limiting implementations.

Attention is next directed to FIG. 6 which depicts a non-limiting implementation of blocks 303, 305 of method 300, assuming that altered notification data 539 has been stored at memory 122. In particular, in FIG. 6, device 101 receives a call 615 (and/or a message and/or any other data) using interface 124; hence, in FIG. 6, a technical event is occurring at device 101 comprising receiving wireless data (e.g. call 615) at interface 124. Hence, the term "event" as used herein is not an abstract idea and/or abstract event, but rather a technical event and/or a technical change which occurs at hardware of device 101; in particular, interface 124 receives call 615, and device 101 determines (e.g. at block 303), in response, that a notification thereof is to occur at device 101.

Device 101 can include a database and/or table and, the like (which can be stored at memory 122) of technical changes and/or technical events that can occur at device 101 in association with notifications that are to be provided in response to such technical changes and/or technical events. For example, such a database and/or table can include an indication that when a call is received using interface 124, speaker 128 is to be controlled using speaker notification data (e.g. of notification data 139) to provide a notification thereof. However, by way of controller 120 processing application 146, controller 120 can override such an indication and instead control speaker 128 (and/or notification devices 121) suing altered notification data 539.

Hence, as depicted, controller 120 controls notification device 121, and in particular speaker 128, using altered notification data 539 to output a notification 639 (e.g. at block 305). Hence, as depicted, the event comprises receiving call 615 at device 101, notification data 139 can comprises a ringtone and/or a default ringtone, and altered notification data 539 can comprise a customized ringtone and/or a customize default ringtone, altered and/or customized using identification data 140 and/or a hash thereof.

Alternatively, the event can comprises receiving a message at device 101, and notification data 139 can comprise message notification data, which can include sound data, while altered notification data 539 can comprise altered message notification data, which can include altered and/or customized sound data, altered and/or customized using identification data 140 and/or a hash thereof.

When notification device 121 includes a visual notification device, such as display device 126, and light 127, the notification data comprises visual notification data such as a received message icon and/or a pattern of flashes and/or flashing lights, and altered notification data 539 can comprise altered visual notification data, which can include an altered and/or customized icon and/or pattern, altered and/or customized using identification data 140 and/or a hash thereof.

When notification device 121 includes a haptic notification device, such as haptic device 129, the notification data comprises haptic notification data such as pattern of vibrations, and altered notification data 539 can comprise altered haptic notification data, which can include an altered and/or customized pattern of vibrations, altered and/or customized using identification data 140 and/or a hash thereof.

As depicted in FIG. 5 and FIG. 6, identification data 140 can be static and stored at other devices associated with one or more of account identifiers 143. Hence, when another device stores identification data 140 and also processes application 146, altered notification data 539 can also be produced at that device. Such a situation can occur when a user has multiple devices each configured with the same account identifiers 143; while a device identifier (such as device identifier 141) can change from device to device, controller 120 can be configured to implement method 300 on the basis of account identifiers 143 to ensure that generation of altered notification data 539 is similar from device to device each associated with the same accounts.

Alternatively, once altered notification data 539 has been generated, altered notification data 539 can be exported to another device associated with one or more account identifiers 143; for example, once altered notification data 539 has been generated, altered notification data 539 can be transmitted to a server managing an account associated with device 101, which can distribute altered notification data 539 to other devices associated with the account.

Figure 10:
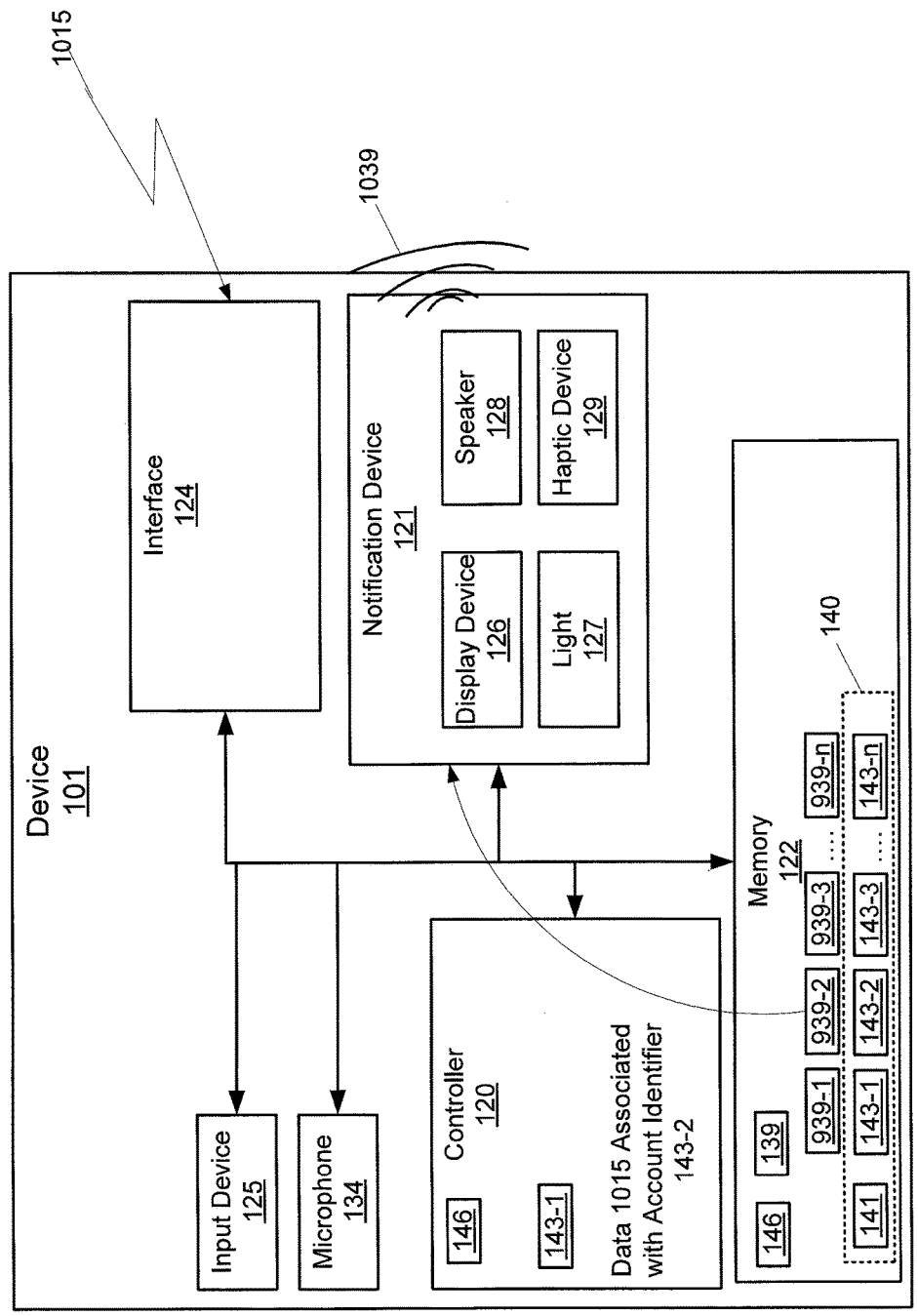
FIG. 10 depicts the device of FIG. 2 providing a notification of an event associated with an inactive account using associated altered notification data, according to non-limiting implementations.

Heretofore, implementations where FIG. 10 depicts the device of FIG. 2 providing a notification of an event associated with an inactive account using associated altered notification data, according to non-limiting implementations.

is generated prior to an event at device 101 are described. For example, altered notification data 539 can be generated when application 146 is installed, and/or when a notification sound, and the like, is associated with a given event. For example, when input device 125 is used to select a given notification that is to occur when a given event occurs, notification data 139 can be updated to include notification data corresponding to the given notification and altered notification data 539 can be generated and/or regenerated, in response thereto. Hence, when a user changes a ringtone of device 101, controller 120 can automatically generate an altered ringtone (e.g. and stored in altered notification data 539) according to block 301 of method 300; hence when a call is later received the altered ringtone is used to control speaker 128 to provide a notification of the call.

Figure 7:
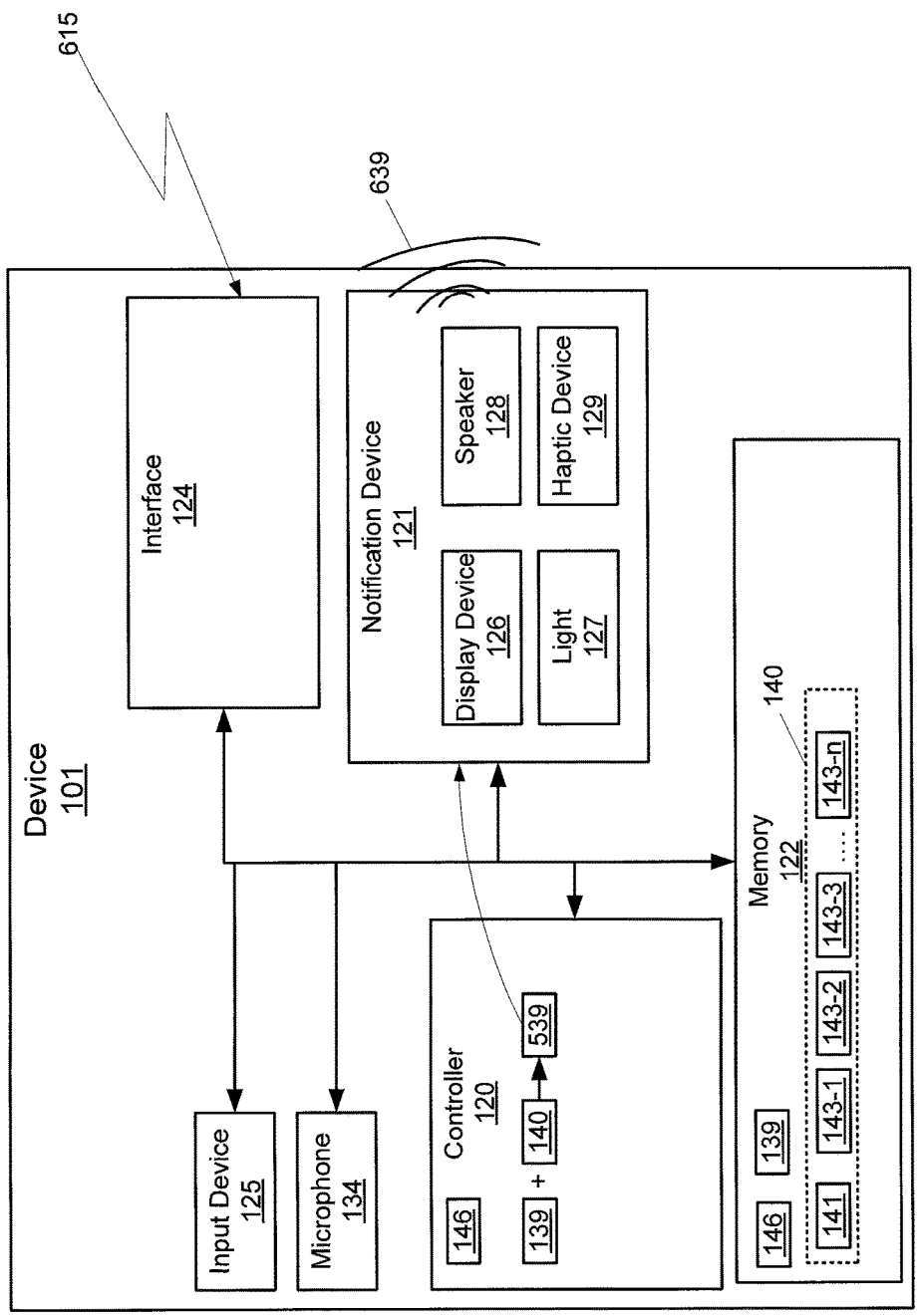
FIG. 7 depicts the device of FIG. 2 providing a customized notification using altered notification data, the altered notification data generated when an event occurs, according to non-limiting implementations.

However, attention is next directed to FIG. 7 which depicts an alternative implementation of method 300. In particular, in FIG. 7 altered notification data 539 is not stored at memory 122 when call 615 is received. Rather, block 301 occurs in response to block 303; in other words, when controller 120 determines, at block 303, that a notification of an event is to occur at device 101, controller 120: alters notification data 139 using the identification data 140 to generate altered notification data 539 (e.g. at block 301); and controls notification device 121 to provide altered notification data 539. In other words, in these implementations altered notification data 539 is not generated until an event occurs for which a notification is to be provided.

Figure 8:
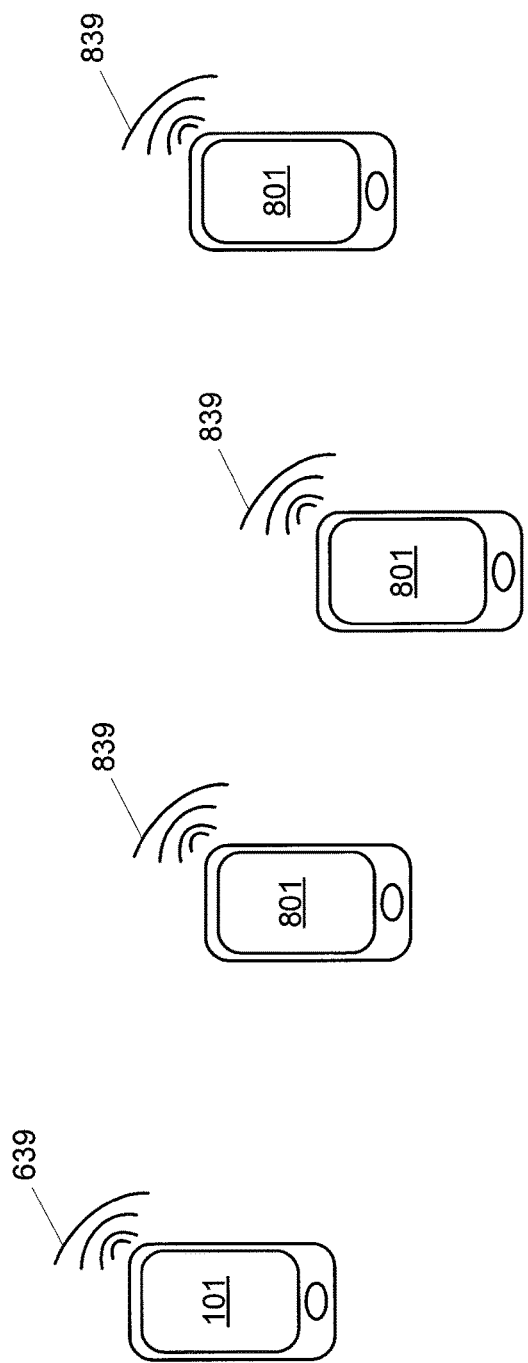
FIG. 8 depicts a plurality of devices providing notifications, with one device having an automatically customized notification different from notifications of the other devices, according to non-limiting implementations.

Attention is next directed to FIG. 8 which depicts device 101 and a plurality of devices 801 similar to device 101. In FIG. 8, it is assumed that each of devices 101, 801 is receiving a respective call, though not necessarily simultaneously, that each of devices 801 has the same default ringtone, and that an altered default ringtone has been generated using method 300 from the same default ringtone. Hence, each of devices 801 output a same notification 839 of a respective call, creating confusion and a waste of resources at each of devices 801 as each user checks their device 801, while device 101 outputs a different notification 639. Furthermore, when a device 801 outputs notification 839, resources at device 101 can be conserved as can be understood that device 101 has an altered notification 639 and not notification 839.

Figure 9:
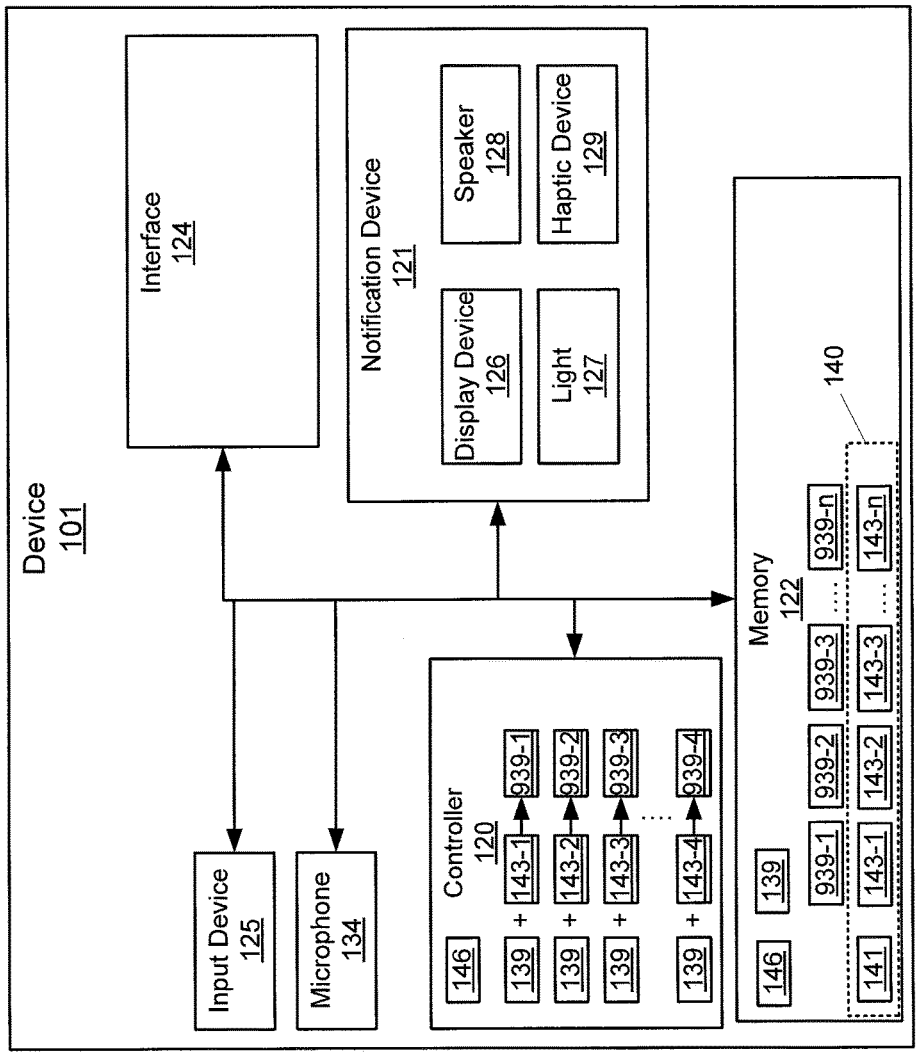
FIG. 9 depicts the device of FIG. 2 generating a plurality of altered notification data sets, one for each account identifier, according to non-limiting implementations.

Attention is next directed to FIG. 9 which depicts an implementation of block 401 of method 400 (which is also a non-limiting implementation of block 301 of method 300). In particular, in these implementations, controller 120 alter notification data 139 using a given account identifier 143, of plurality of account identifiers 143, to generate altered notification data and, as depicted, generates a plurality of altered notification data sets 939-1, 939-2, 939-3 . . . 939-*n* by altering notification data 139 using each of plurality of account identifiers 143, in a one-to-one relationship. Hence, as there are "n" account identifiers, "n" altered notification data sets 939-1, 939-2, 939-3 . . . 939-*n* are produced. Altered notification data sets 939-1, 939-2, 939-3 . . . 939-*n* will be interchangeably referred to hereafter, collectively, as altered notification data sets 939 and, generically, as altered notification data 939. In other words, as depicted, for each account identifier 143, corresponding altered notification data 939 is generated in manner similar to that described above with respect to generation of altered notification data 539. Furthermore, altered notification data sets 939 are stored in memory 122, for example, each in association with a corresponding account identifier 143.

Attention is next directed to FIG. 10 which depicts a non-limiting implementation of blocks 403, 405 of method 400. It is assumed in FIG. 10 that altered notification data sets 939 are stored in memory 122. Furthermore, an event occurs at device 101 (similar to events described above) and in particular data 1015 is received at interface 124. Hence, controller 120 determines that a notification of the event is to occur at device 101 (e.g. at block 403), and in particular a notification for a given account identified by given account identifier 143 (used to generate corresponding altered notification data 939) and with which the event is associated. For example, data 1015 can comprise a message, a call, and the like and controller 120 can determine which of plurality of accounts is associated with a current event (e.g. receipt of data 1015) occurring at device 101.

Such a determination can include comparing any identifiers received in data 1015 with contact data, and the like, associated with each of account identifiers 143. For example, memory 122 can further store contact data (not depicted) associated with each account identifier 143 and an identifier received with data 1015 can be compared to such contact data to determine which account identifier 143 is, in turn, associated with data 1015. For example, data 1015 can comprise a message from an address stored in association with account identifier 143-2, but not others of account identifiers 143, and hence controller 120 can determine (e.g. at block 403) that data 1015 is associated with account identifier 143-2.

Hence, controller 120 can (e.g. at block 405) control notification device 121, and in particular, speaker 128, to provide altered notification data 939-2, and speaker outputs a notification 1039 using altered notification data 939-2.

Figure 11:
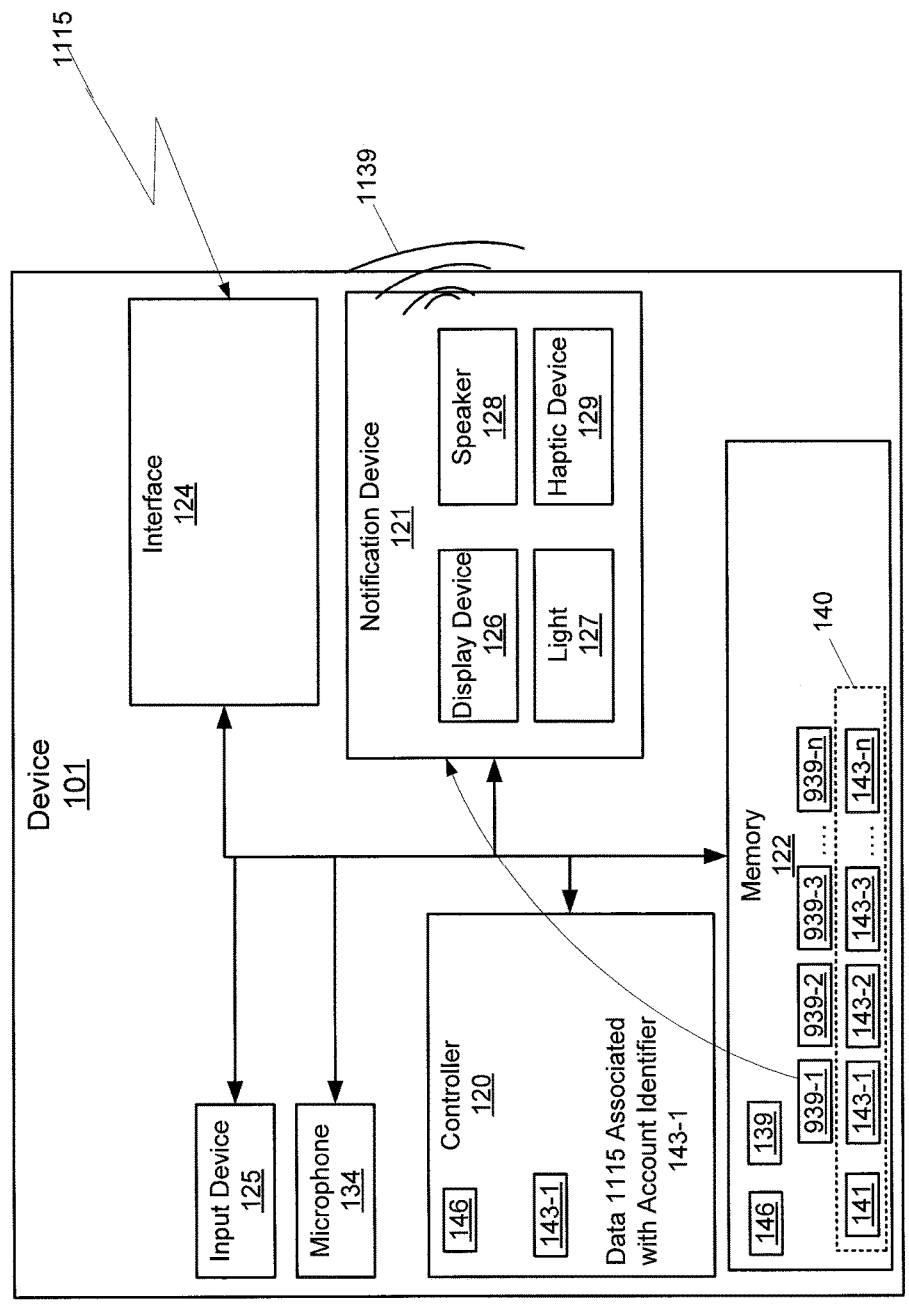
FIG. 11 depicts the device of FIG. 2 providing a notification of an event associated with an active account using associated altered notification data, according to non-limiting implementations.

Attention is next directed to FIG. 11, which is substantially similar to FIG. 10, with like elements having like numbers; however, in FIG. 11, interface 124 is receiving data 1115 associated with account identifier 939-1. Hence, controller 120 can (e.g. at block 405) control notification device 121, and in particular, speaker 128, to provide altered notification data 939-1, and speaker outputs a notification 1139 using altered notification data 939-1.

Hence, comparing FIG. 10 and FIG. 11, not only are notifications 1039, 1139 customized with respect to similar notifications at other devices, but notifications 1039, 1139 are customized with respect to each other, as each is generated using different altered notification data 939, each of which has been generated from the same starting notification data 139. In other words, controller 120 can control notification device 121 to provide a given one of the plurality of altered notification data sets 939 associated with an account associated with a current event, and hence, notification sounds, and the like, can be automatically customized for each account identified by a corresponding account identifier.

Furthermore, such notifications can be provided regardless of whether data 1015, 1115 is associated with an active or an inactive account.

For example, some devices associated with more than one account are configured to have only one account active at any given time, with an account being activated in a log-in process, and an active account being inactive through a log-out process; hence, for example, only data associated an active account can be accessed at device 101 and/or only outgoing messages can be sent from the active account, and not an inactive account. An inactive account as described herein can hence include an account which has been logged out of, but that can be later logged back into render it active, for example using input device 125.

For example, in implementations depicted in FIG. 10 and FIG. 11, it is assumed that an account associated with account identifier 143-1 is active, as indicated by controller 120 processing account identifier 143-1. However, in FIG. 10, data 1015 is associated with an inactive account associated with account identifier 143-2, and notification device 121 is nonetheless controlled to provide a notification 1039 using altered notification data 939-2. Hence, in these implementations, controller 120 can be further configured to: activate one account, of the plurality of accounts, at a time; and, control notification device 121 to provide altered notification data 939 when a given account is active or inactive, the given account associated with an event for which a notification is to be provided.

However, in other implementations, when an account is inactive, no notification is provided of an associated event, at least until the account is again rendered active.

In yet further implementations device 101 can be configured to include more than one active account, and notifications can be provided for all active accounts using associated altered notification data 939.

While implementations depicted in FIG. 10 and FIG. 11 include generating altered notification data sets 939 prior to an event occurring, in other implementations altered notification data 939 can be generated when the event occurs similar to implementations described with respect to FIG. 7.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not depicted) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive, flash memory, and the like). Furthermore, the computer-readable program can be stored as a computer program product comprising a computer usable medium. Further, a persistent storage device can comprise the computer readable program code. The computer-readable program code and/or computer usable medium can comprise a non-transitory computer-readable program code and/or non-transitory computer usable medium. Alternatively, the computer-readable program code could be stored remotely but transmittable to these components via a modem, network interface card, or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is to be limited by the claims appended here.

What is claimed is:
1. A device comprising:
a controller;
a notification device; and
a memory storing: notification data; and identification data, the identification data comprising one or more of:
an identifier of the device; and an account identifier identifying an account associated with the device, the controller configured to:
  alter the notification data using the identification data to generate altered notification data by producing a hash of at least a portion of the identification data and using the hash as input to an application for altering the notification data;
  determine that a notification of an event is to occur at the device; and
  control the notification device to provide the altered notification.

2. The device of claim 1, wherein the identification data further comprises a plurality of account identifiers, including the account identifier, each of the plurality of account identifiers identifying a corresponding account, of a plurality of accounts associated with the device, in a one-to-one relationship, the controller further configured to:
  alter the notification data using a given account identifier, of the plurality of account identifiers, to generate the altered notification data;
  determine that the notification of the event is to occur at the device for a given account identified by the given account identifier; and
  control the notification device to provide the altered notification data.

3. The device of claim 2, wherein the controller is further configured to:
  activate one account, of the plurality of accounts, at a time; and, control the notification device to provide the altered notification data when the given account is active or inactive.

4. The device of claim 2, wherein the controller is further configured to:
  generate a plurality of altered notification data sets, including the altered notification data, by altering the notification data using each of the plurality of account identifiers; and,
  determine which of the plurality of accounts is associated with a current event occurring at the device; and
  control the notification device to provide a given one of the plurality of altered notification data sets associated with an account associated with the current event.

5. The device of claim 1, wherein the notification device comprises a speaker, the notification data comprises speaker notification data, and the controller is further configured to alter the notification data by one or more of: adding to the to the speaker notification data, subtracting from the speaker notification data, and altering one or more of tone, pitch, and duration of sounds of the speaker notification data.

6. The device of claim 1, wherein the identification data is static, and is stored at other devices associated with the account.

7. The device of claim 1, wherein the event comprises receiving a call at the device, and the notification data comprises a ringtone.

8. The device of claim 1, wherein the event comprises receiving a message at the device, and the notification data comprises message notification data.

9. The device of claim 1, wherein the notification device comprises a visual notification device, and the notification data comprises visual notification data.

10. A method comprising:
  at a device including: a controller; a notification device; and a memory storing: notification data; and identification data, the identification data comprising one or more of: an identifier of the device; and an account identifier identifying an account associated with the device,
    altering, at the controller, the notification data using the identification data to generate altered notification data by producing a hash of at least a portion of the identification data and using the hash as input to an application for altering the notification data;
    determining, at the controller, that a notification of an event is to occur at the device; and,
    controlling, at the controller, the notification device to provide the altered notification.

11. The method of claim 10, wherein the identification data further comprises a plurality of account identifiers, including the account identifier, each of the plurality of account identifiers identifying a corresponding account, of a plurality of accounts associated with the device, in a one-to-one relationship, and the method further comprises:
  altering, at the controller, the notification data using a given account identifier, of the plurality of account identifiers, to generate the altered notification data;
  determining, at the controller, that the notification of the event is to occur at the device for a given account identified by the given account identifier; and
  determining, at the controller, the notification device to provide the altered notification data.

12. The method of claim 11, further comprising:
  activating, at the controller, one account, of the plurality of accounts, at a time; and,
  controlling, at the controller, the notification device to provide the altered notification data when the given account is active or inactive.

13. The method of claim 11, further comprising:
  generating, at the controller, a plurality of altered notification data sets, including the altered notification data, by altering the notification data using each of the plurality of account identifiers; and,
  determining, at the controller, which of the plurality of accounts is associated with a current event occurring at the device; and
  controlling, at the controller, the notification device to provide a given one of the plurality of altered notification data sets associated with an account associated with the current event.

14. The method of claim 10, wherein the notification device comprises a speaker, the notification data comprises speaker notification data, and the method further comprises altering, at the controller, the notification data by one or more of: adding to the to the speaker notification data, subtracting from the speaker notification data, and altering one or more of tone, pitch, and duration of sounds of the speaker notification data.

15. The method of claim 10, wherein the identification data is static, and is stored at other devices associated with the account.

16. The method of claim 10, wherein the event comprises receiving a call at the device, and the notification data comprises a ringtone.

17. The method of claim 10, wherein the event comprises receiving a message at the device, and the notification data comprises message notification data.

18. A non-transitory computer-readable medium storing a computer program, wherein execution of the computer program is for:
  at a device including: a controller; a notification device; and a memory storing: notification data; and identification data, the identification data comprising one or more of: an identifier of the device; and an account identifier identifying an account associated with the device, altering, at the controller, the notification data using the identification data to generate altered notification data by producing a hash of at least a portion of the identification data and using the hash as input to an application for altering the notification data;
determining, at the controller, that a notification of an event is to occur at the device; and,
controlling, at the controller, the notification device to provide the altered notification.

* * * * *